United States Patent
Li et al.

(10) Patent No.: US 9,835,834 B2
(45) Date of Patent: Dec. 5, 2017

(54) OPTICAL LENS

(71) Applicant: HAN'S LASER TECHNOLOGY INDUSTRY GROUP CO., LTD., Shenzhen (CN)

(72) Inventors: Jiaying Li, Shenzhen (CN); Chaoming Zhou, Shenzhen (CN); Yunfeng Gao, Shenzhen (CN)

(73) Assignee: HAN'S LASER TECHNOLOGY INDUSTRY GROUP CO., LTD., Shenzhen (CN)

( * ) Notice: Subject to any disclaimer, the term of this patent is extended or adjusted under 35 U.S.C. 154(b) by 0 days.

(21) Appl. No.: 15/322,546

(22) PCT Filed: Aug. 4, 2014

(86) PCT No.: PCT/CN2014/083609
§ 371 (c)(1),
(2) Date: Dec. 28, 2016

(87) PCT Pub. No.: WO2016/019487
PCT Pub. Date: Feb. 11, 2016

(65) Prior Publication Data
US 2017/0153428 A1    Jun. 1, 2017

(51) Int. Cl.
*G02B 13/04*    (2006.01)
*G02B 9/00*    (2006.01)
(Continued)

(52) U.S. Cl.
CPC .............. *G02B 13/18* (2013.01); *G02B 9/64* (2013.01)

(58) Field of Classification Search
CPC ........................ G02B 13/04; G02B 13/0045
(Continued)

(56) References Cited

U.S. PATENT DOCUMENTS 2,897,725 A * 8/1959 Klempt et al. ......... G02B 13/04
359/660
4,981,344 A    1/1991 Ueda

FOREIGN PATENT DOCUMENTS

CN    201555978 U    8/2010
CN    101943789 A    1/2011
(Continued)

OTHER PUBLICATIONS

International Search Report dated May 8, 2015 from application No. PCT/CN2014/08360.
(Continued)

*Primary Examiner* — William Choi
(74) *Attorney, Agent, or Firm* — Platinum Intellectual Property LLP

(57) ABSTRACT

An optical lens, comprising a first to an eighth lens (L1, L2, L3, L4, L5, L6, L7, L8) coaxially arranged in sequence along the direction of transmission of an incident light ray. The first lens (L1) is a negative meniscus lens, and the curved surface of the first lens (L1) is convex to the object side; the second lens (L2) is a positive biconvex lens; the third lens (L3) is a negative biconcave lens; the fourth lens (L4) is a positive meniscus lens and the curved surface of the fourth lens (L4) is convex to the object side; the fifth lens (L5) is a negative meniscus lens and the curved surface of the fifth lens (L5) is convex to the object side; the sixth lens (L6) is a positive biconvex lens; the seventh lens (L7) is a negative meniscus lens and the curved surface of the seventh lens (L7) is convex to the image side; and the eighth lens (L8) is a negative meniscus lens and the curved surface of the eighth lens (L8) is convex to the image side; the fourth lens (L4) and the fifth lens (L5) are respectively positioned on the two sides of an optical diaphragm (200) of the optical lens; the second lens (L2), the third lens (L3), and the fourth lens (L4) form a first cemented lens set; and the fifth lens (Continued)

(L5), the sixth lens (L6), and the seventh lens (L7) form a second cemented lens set. The present optical lens has a relatively large field-of-view, and obtains high-definition zero distortion imaging results.

16 Claims, 5 Drawing Sheets

(51) Int. Cl.
*G02B 13/18* (2006.01)
*G02B 9/64* (2006.01)

(58) Field of Classification Search
USPC ........................................ 359/708, 750, 754
See application file for complete search history.

(56) References Cited

FOREIGN PATENT DOCUMENTS

| CN | 102914859 A | 2/2013 |
|---|---|---|
| CN | 103777316 A | 5/2014 |

OTHER PUBLICATIONS

International Search Report dated May 6, 2015 from application No. PCT/CN2014/083136.

\* cited by examiner

OPTICAL LENS

FIELD OF THE INVENTION

The present disclosure relates an optical technical field, and more particular relates to an optical lens.

BACKGROUND OF THE INVENTION

In photography, especially in high altitude photography, there is a relative higher requirement for a distortion and a definition of imaging, therefore, a general requested optical lens should have a property such as an ultra-wide field, without distortion, and a high definition. A conventional aerial photographic lens has a focal length f=88 millimeters, a relative aperture of 1/5.6, a field angle 2ω=124 degrees, and a dimension of imaging of 254×254 square millimeter. Due to a fast development of a electronic modernization product, the conventional optical lens cannot satisfies a requirement of the electronic modernization product.

SUMMARY

Therefore, it is necessary to provide an optical lens with satisfy an electronic requirement and has an ultra-wide field and high definition without distortion.

An optical lens includes: a first lens, a second lens, a third lens, a fourth lens, a fifth lens, a sixth lens, a seventh lens, and an eighteen lens that are successively and coaxially arranged along a transmission direction of an incident light ray; wherein the first lens is a negative meniscus lens which has a curved surface convex to an object side; the second lens is a positive biconvex lens; the third lens is a negative biconcave lens; the fourth lens is a positive meniscus lens which has a curved surface convex to the object side; the fifth lens is a negative meniscus lens which has a curved surface convex to the object side; the sixth lens is a positive biconvex lens; the seventh lens is a negative meniscus lens which has a curved surface convex to an image side; the eighth lens is a negative meniscus lens which has a curved surface convex to the image side; the fourth lens and the fifth lens are located on opposite sides of an optical diaphragm, the second lens, the third lens, and the fourth lens form a first bonding lens assembly, and the fifth lens, the sixth lens, the seventh lens, and the eighth lens form a second bonding lens assembly.

According to an embodiment, the first lens includes a first curved surface and a second curved surface, the second lens includes a third curved surface and a fourth curved surface, the third lens includes a fifth curved surface and a sixth curved surface, the fourth lens includes a seventh curved surface and an eighth curved surface, the fifth lens includes a ninth curved surface and a tenth curved surface, the sixth lens includes an eleventh curved surface and a twelfth curved surface, the seventh lens includes a thirteenth curved surface and a fourteenth curved surface, the eighth lens includes a fifteenth curved surface and a sixteenth curved surface, the first to the sixteenth curved surfaces are successively arranged along the transmission direction of the incident light ray, radiuses of curvature of the first to the sixteenth curved surfaces are 42.8, 9.2, 13, −14, −14, 4, 4, 65, 62, 16, 16, −6, −6, −14, −13, and −40, respectively, an unit is millimeter, an upper limit deviation of the radius of curvature is 5%, and a lower limit deviation is 5%.

According to an embodiment, central thicknesses of the first to the eighth lenses are 1, 6, 3, 2, 2, 4, 1, and 1, respectively, an unit is millimeter, an upper limit deviation of the central thickness is 5%, and a lower limit deviation is −5%.

According to an embodiment, a distance between the second curved surface and the third curved surface along a principal optical axis is 6 millimeters, a distance between the eighth curved surface and the ninth curved surface along the principal optical axis is 0.3 millimeters, and a distance between the fourteenth curved surface and the fifteenth curved surface along the principal optical axis is 18 millimeters, an upper limit deviation of the distance is 5%, and a lower limit deviation is −5%

According to an embodiment, the first to the eighth lenses are rotational symmetry about a principal optical axis.

According to an embodiment, the first to the eighth lenses have spherical surfaces.

According to an embodiment, the first to the eighth lenses have ratios of refractive index to Abbe number of 1.62/60, 1.69/54, 1.7/40, 1.6/32, 1.56/58, 1.69/50, 1.75/27, and 1.62/60, with an upper limit deviation of 5%, and a lower limit deviation of −5%.

According to an embodiment, the first to the eighth lenses are optical glasses.

According to an embodiment, further includes a ninth lens, wherein the ninth lens and the first lens are successively and coaxially arranged along the transmission direction of the incident light ray.

According to an embodiment, the ninth lens has a ratio of refractive index to Abbe number of 1.5/64, with an upper limit deviation of 5%, and a lower limit deviation of −5%.

According to an embodiment, a projection of the ninth lens along the incident light ray is a circle having a diameter of 42 millimeters, with an upper limit deviation of the diameter of 5%, and a lower limit deviation of −5%.

According to an embodiment, the ninth lens includes a seventeenth curved surface and an eighteenth surface, curvatures of the seventeenth curved surface and the eighteenth surface are zero.

According to an embodiment, a distance between the eighteenth curved surface and the first curved surface along a principal optical axis is 1 millimeters, with an upper limit deviation of the distance of 5%, and a lower limit deviation of −5%.

According to an embodiment, the ninth lens has a thickness of 3 millimeters, with an upper limit deviation of 5%, and a lower limit deviation of −5%.

According to an embodiment, the ninth lens is a planar protective glass.

According to an embodiment, a distance between the seventeenth surface and an imaging surface is 51.7 millimeters.

In the optical lens mentioned above, a combination of lenses of different types which are coaxially arranged is adopted, it not only has a relative larger field angle, but also has an ultra-wide field. An imaging of the optical lens can realize a high definition without distortion, and an actual imaging identical to the geography can be obtained, which can satisfy requirements of high altitude photography and an aerial photography. The chromatic aberration can be eliminated by providing a first bonding lens assembly and a second bonding lens assembly, and the imaging quality is relative high. In the optical lens mentioned above, the focal length is 22 millimeters, the relative aperture of 1/5.6, the field angle is 124 degrees, and a dimension of imaging is A=64×64 square millimeter, which can satisfy a requirement of the electronic modernization.

BRIEF DESCRIPTION OF THE DRAWINGS

To illustrate the technical solutions according to the embodiments of the present invention more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

Embodiments of the achromatic lens with a greater field angle according to invention are described more fully hereinafter with reference to the accompanying drawings, in which preferred embodiments of the invention are shown. The various embodiments of the invention may, however, be embodied in many different forms and should not be construed as limited to the embodiments set forth herein. Rather, these embodiments are provided so that this invention will be thorough and complete, and will fully convey the scope of the invention to those skilled in the art. Unless otherwise specified, all terminologies and scientific terms used herein have the same meaning as normal sense understood by a technical person belonging to the technical field of the present invention. The terms used herein is for the purpose of describing particular embodiments only and is not intended to be limiting of the present invention. As used herein, the term "and/or" includes any and all combinations of one or more of the associated listed items.

It should be noted that the negative sign used herein means the light propagates from left to right. Taking the intersection point of the spherical surface and the principal optical axis as a reference point, if the center of the spherical surface is in the left of the intersection point, the radius of curvature has a negative value, on the other hand, the center of the spherical surface is in the right of the intersection point, the radius of curvature has a positive value. In addition, in view of the light propagating from left to right, one side on the left of the lens is referred as the object side, and the other side on the right of the lens is referred as the image side. The positive lens is a lens that has a central thickness greater than a thickness of the edge, The negative lens is a lens that has a central thickness less than a thickness of the edge.

Figure 1:
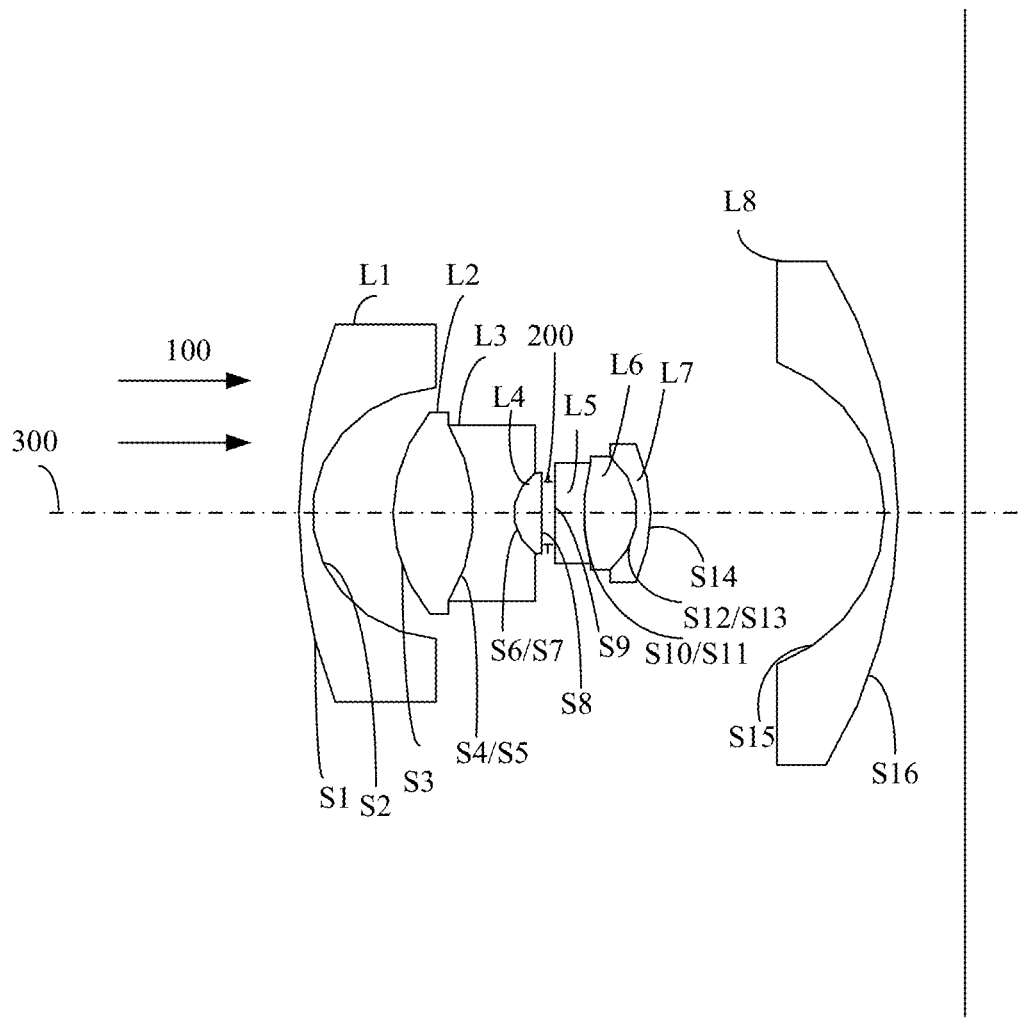
FIG. 1 is a perspective view of an optical lens according to an embodiment.

FIG. 1 is a schematic view of an optical lens according to an embodiment, which includes a first lens L1, a second lens L2, a third lens L3, a fourth lens L4, a fifth lens L5, a sixth lens L6, a seventh lens L7, and an eighteen lens L8 that are successively and coaxially arranged along a transmission direction of an incident light ray (a principal optical axis).

The first lens L1 is a negative meniscus lens which has a curved surface convex to an object side. The second lens L2 is a positive biconvex lens. The third lens L3 is a negative biconcave lens. The fourth lens L4 is a positive meniscus lens which has a curved surface convex to the object side. The fifth lens L5 is a negative meniscus lens which has a curved surface convex to the object side. The sixth lens L6 is a positive biconvex lens. The seventh lens L7 is a negative meniscus lens which has a curved surface convex to an image side. The eighth lens L8 is a negative meniscus lens which has a curved surface convex to the image side. In the illustrated embodiment, the second lens L2, the third lens L3, and the fourth lens L4 form a first bonding lens assembly, and the fifth lens L5, the sixth lens L6, the seventh lens L7, and the eighth lens L8 form a second bonding lens assembly. The first bonding lens assembly and the second bonding lens assembly are located on opposite sides of an optical diaphragm 200. The first bonding lens assembly is configured to eliminate an axial chromatic aberration, the second bonding lens assembly is configured to eliminate a chromatic difference of magnification, an imaging quality is high.

The first lens L1 includes s a first curved surface Si and a second curved surface S2. The second lens L2 includes a third curved surface S3 and a fourth curved surface S4. The third lens L3 includes a fifth curved surface S5 and a sixth curved surface S6. The fourth lens L4 includes a seventh curved surface S7 and an eighth curved surface S8. The fifth lens L5 includes a ninth curved surface S9 and a tenth curved surface S10. The sixth lens L6 includes an eleventh curved surface S 11 and a twelfth curved surface S12. The seventh lens L7 includes a thirteenth curved surface S13 and a fourteenth curved surface S14. The eighth lens L8 includes a fifteenth curved surface S15 and a sixteenth curved surface S16. The first curved surface Si to the sixteenth curved surface S16 are successively arranged along the transmission direction of the incident light ray 100. Radiuses of curvature of the first curved surface S1 to the sixteenth curved surface S16 are 42.8, 9.2, 13, −14, −14, 4, 4, 65, 62, 16, 16, −6, −6, −14, −13, and −40, respectively, an unit is millimeter. An upper limit deviation of the radius of curvature is 5%, with an upper limit deviation of 5%, and a lower limit deviation of 5%, i.e. a qualified value ranging within ±5% also falls into a protection scope.

In the illustrated embodiment, the first lens L1 to the eighth lens L8 have spherical surfaces. The first lens L1 to the eighth lens L8 is rotational symmetry about the principal optical axis 300. Specifically, central thicknesses of the first lens L1 to the eighth lens L8 are 1, 6, 3, 2, 2, 4, 1, and 1 millimeter, respectively, with an upper limit deviation of 5%, and a lower limit deviation of −5%. Materials of the first lens L1 to the eighth lens L8 have a ratio of refractive index to Abbe number of 1.62/60, 1.69/54, 1.7/40, 1.6/32, 1.56/58, 1.69/50, 1.75/27, and 1.62/60, with an upper limit deviation of 5%, and a lower limit deviation of −5%. In the illustrated embodiment, a distance between the second curved surface S2 and the third curved surface S3 (i.e. a distance between the first lens L1 and the first lens L2) along the principal optical axis 300 is 6±5% millimeters. A distance between the eighth curved surface S8 and the ninth curved surface S9 along the principal optical axis 300 is 0.3±5% millimeters. A distance between the fourteenth curved surface S14 and the fifteenth curved surface S15 along the principal optical axis 300 is 18±5% millimeters.

Figure 2:
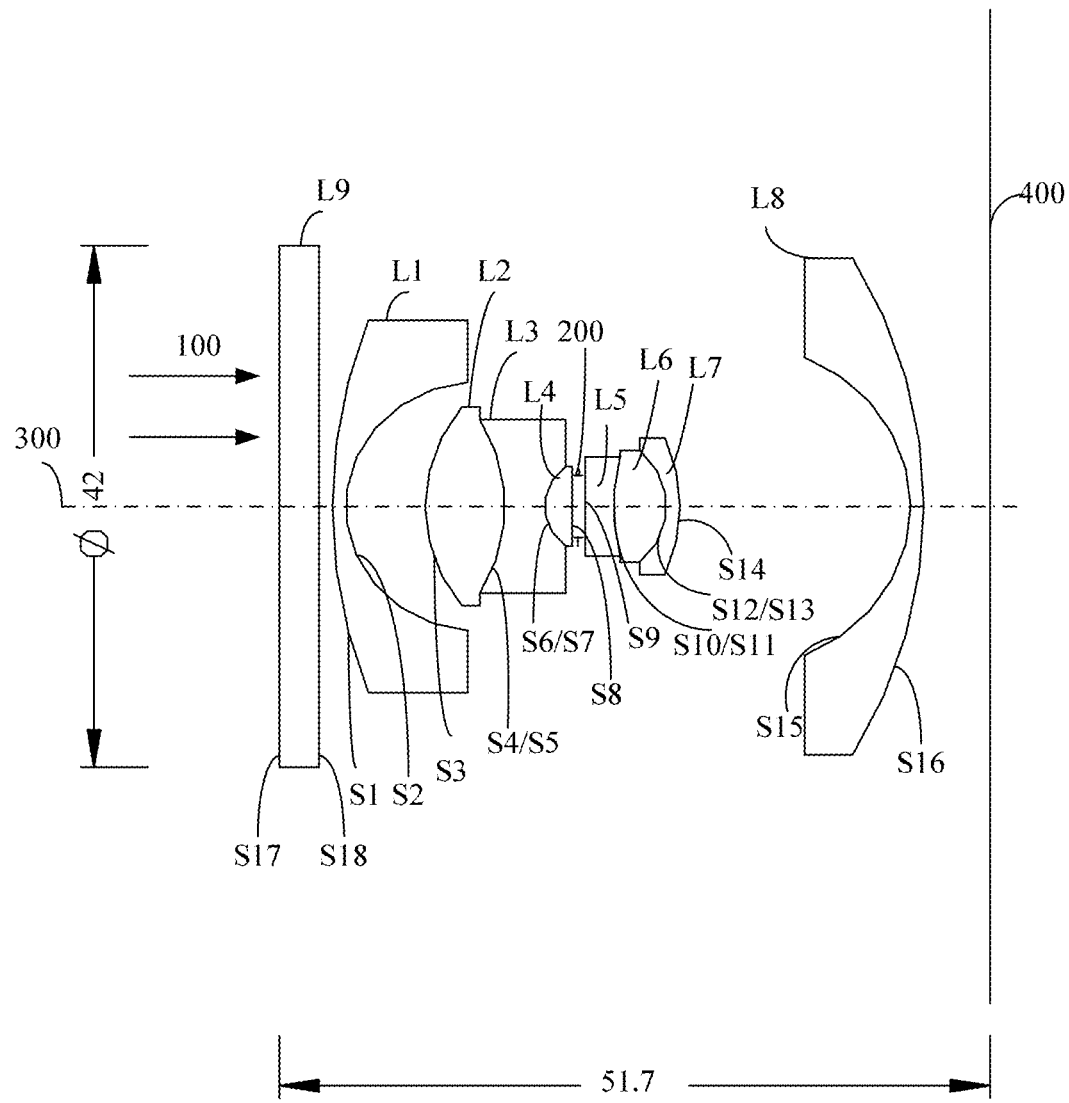
FIG. 2 is a perspective view of an optical lens according to another embodiment.

FIG. 2 is a schematic view of an optical lens according to another embodiment. In the illustrated embodiment, the optical lens includes a first lens L1 to an eighth lens L8, and further includes a ninth lens L9. The ninth lens L9, and the first lens L1 to the eighth lens L8 are successively and coaxially arranged along a transmission direction of an incident light ray 100. Specifically, the material of the ninth lens L9 has a ratio of refractive index to Abbe number of 1.5/64, with an upper limit deviation of 5%, and a lower limit deviation of −5%. The ninth lens L9 includes a seventeenth curved surface S17 and an eighteenth surface S18. In the illustrated embodiment, the ninth lens L9 is a planar protective glass, and is configured to protect the optical lens, therefore, curvatures of the seventeenth curved surface S17 and the eighteenth surface S18 are zero. A thickness of the ninth lens L9 is 3±5% millimeters. The ninth lens L9 has a non spherical structure, a projection of the ninth lens L9 along the incident light ray is a circle having a diameter of 42±5% millimeters.

As shown in FIG. 2, a total length (a distance between the seventeenth curved surface S17 and an imaging surface 400) is 51.7 millimeters, its effective aperture (the diameter of the projection of the ninth lens L9 along the incident light ray) is 42 millimeters, with an upper limit deviation of 5%, and a lower limit deviation of −5%. In the optical lens mentioned above, a focal length is 22 millimeters, a relative aperture is 1/5.6, a field angle is 124 degrees, an area of imaging A=64×64 square millimeters, which can satisfy a requirement of the electronic modernization, and can be used in a CCD image receiver.

In the optical lens mentioned above, a combination of lenses of different types which are coaxially arranged is adopted, it not only has a relative larger field angle, but also has an ultra-wide field. An imaging of the optical lens can realize a high definition without distortion, and an actual imaging identical to the geography can be obtained, which can satisfy requirements of high altitude photography and an aerial photography. The chromatic aberration can be eliminated by providing a first bonding lens assembly and a second bonding lens assembly, and the imaging quality is relative high. In the optical lens mentioned above, the focal length is 22 millimeters, the relative aperture of 1/5.6, the field angle is 124 degrees, and a dimension of imaging is A=64×64 square millimeter, which can satisfy a requirement of the electronic modernization.

Figure 3:
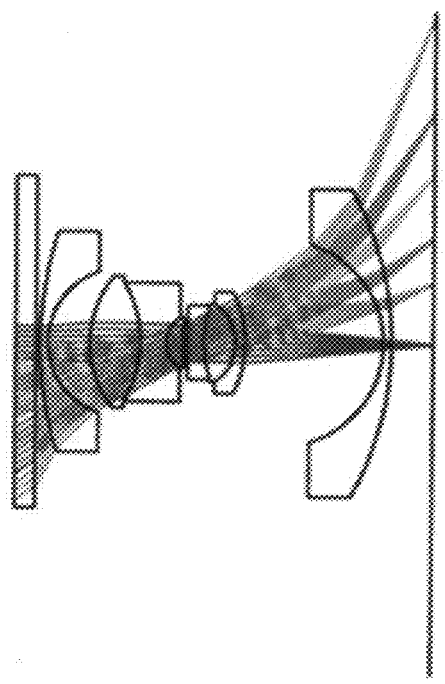
FIG. 3 is a tracing graph of a light ray of the optical lens according to the embodiment of FIG. 2.
Figure 4:
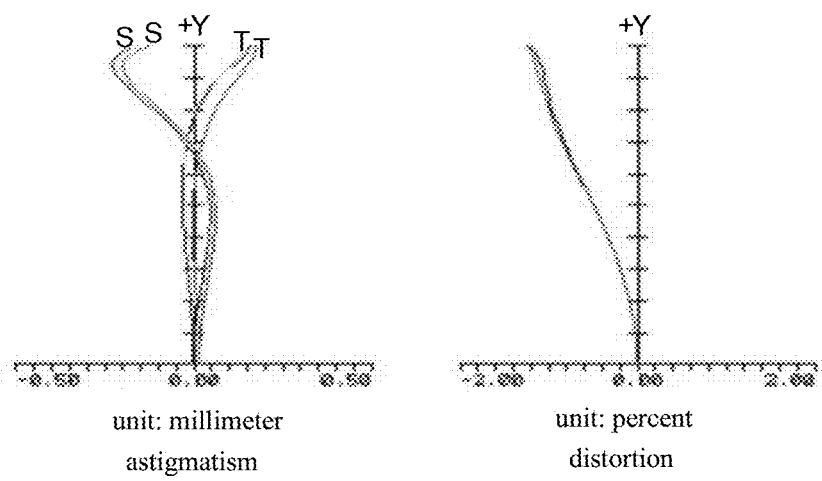
FIG. 4 is a graph of astigmatism and distortion of the optical lens according to the embodiment of FIG. 2.
Figure 5:
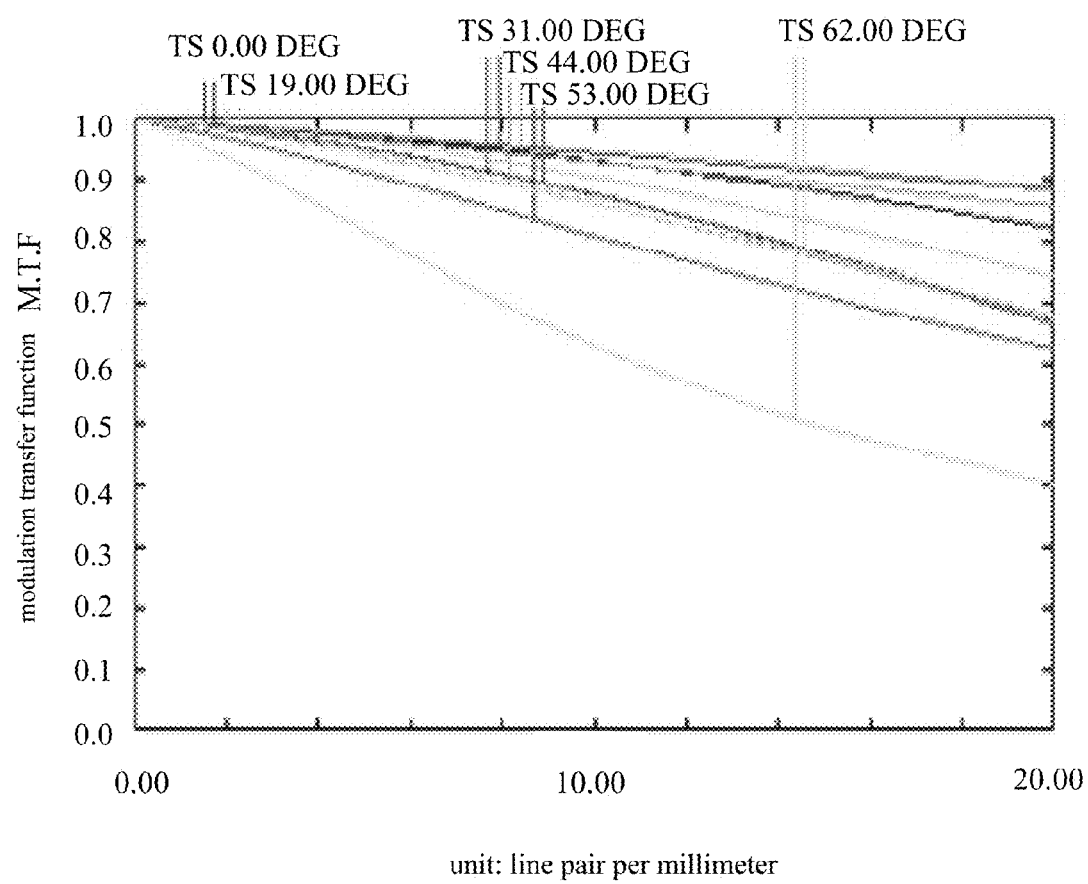
FIG. 5 is a graph of a modulation transfer function M.T.F of the optical lens according to the embodiment of FIG. 2.
Figure 6:
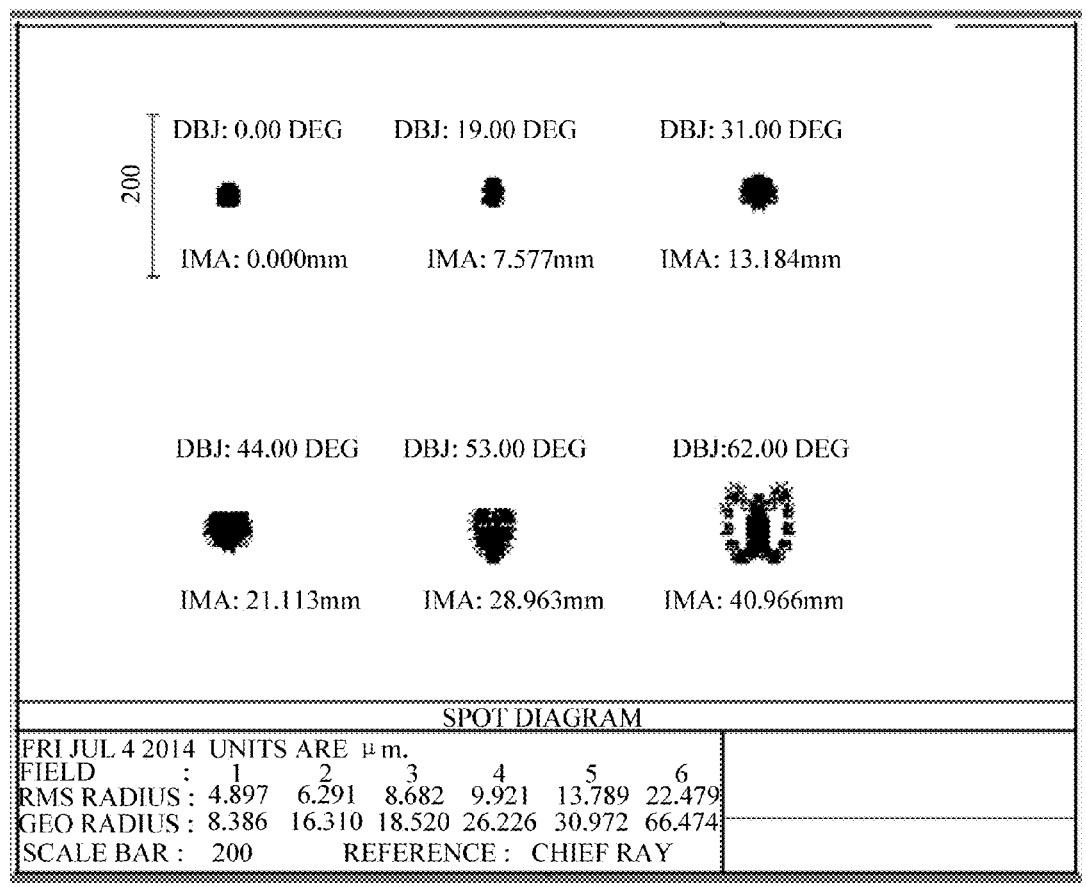
FIG. 6 is a graph of dispersion of the optical lens according to the embodiment of FIG. 2.

FIG. 3 is a tracing graph of a light ray of the optical lens of FIG. 2. It shows that, all the light rays with different apertures can penetrate through. FIG. 4 is a graph of astigmatism and distortion of the optical lens of FIG. 2. In FIG. 4, a vertical coordinate in the graph of astigmatism and distortion is a size of a field angle. It can be seen from FIG. 4, distortion of the optical lens is almost zero, which indicates that the imaging surface is almost a flat surface, and the chromatic dispersion is corrected better. FIG. 5 is a graph of a modulation transfer function M.T.F of the optical lens of FIG. 2. It can be concluded from FIG. 5, when the resolution reaches 20 line pairs per millimeter and the field angle is 62 (TS 62.00 DEG) degrees, the M.T.F is also greater than 0.4, which indicates that the optical lens can reach a relative ideal level when the relative aperture is greater and it has an ultra-wide field, and it has a relative higher imaging quality. FIG. 6 is a graph of dispersion of the optical lens of FIG. 2. It can be concluded from FIG. 6, when the field angle is 44 degrees (DBJ: 44.00 DEG), an imaging height on the imaging surface is 21.113 millimeters (IMA: 21.113 millimeters), a root-mean-square diameter (RMS RADIUS) of the dispersion circle on the whole imaging surface is 9.921 micrometers, which can also be controlled within 10 micrometers, it further shows that the imaging of the optical lens remains comparatively clear when the optical lens has a relative larger field angle. The geometric radius (GEO RADIUS) of the dispersion circle can also be directly seen from FIG. 6. In FIG. 6, an enlarging scale (SCALE BAR) is 200, when taking a chief light ray (CHIEF RAY) for a reference point (REFERENCE).

The optical lens mentioned above has an ultra-wide field without distortion, and an actual imaging identical to the geography can be obtained, it can be used in high altitude photography, and satisfies a requirement of an aerial detection or a measurement.

It should be noted that, those in the art will understand that a number of variations may be made to the disclosed embodiments, all without departing from the scope of the claims of the invention. Accordingly, the scope of the claims of the invention is not merely limited to the detail embodiment mentioned above.

The above are several embodiments of the present invention described in detail, and should not be deemed as limitations to the scope of the present invention. It should be noted that variations and improvements will become apparent to those skilled in the art to which the present invention pertains without departing from its spirit and scope. Therefore, the scope of the present invention is defined by the appended claims.

What is claimed is:

1. An optical lens, comprising: a first lens, a second lens, a third lens, a fourth lens, a fifth lens, a sixth lens, a seventh lens, and an eighteen lens that are successively and coaxially arranged along a transmission direction of an incident light ray;
   wherein the first lens is a negative meniscus lens which has a curved surface convex to an object side;
   the second lens is a positive biconvex lens;
   the third lens is a negative biconcave lens;
   the fourth lens is a positive meniscus lens which has a curved surface convex to the object side;
   the fifth lens is a negative meniscus lens which has a curved surface convex to the object side;
   the sixth lens is a positive biconvex lens;
   the seventh lens is a negative meniscus lens which has a curved surface convex to an image side;
   the eighth lens is a negative meniscus lens which has a curved surface convex to the image side;
   wherein the fourth lens and the fifth lens are located on opposite sides of an optical diaphragm, the second lens, the third lens, and the fourth lens form a first bonding lens assembly, and the fifth lens, the sixth lens, and the seventh lens form a second bonding lens assembly.

2. The optical lens according to claim 1, wherein the first lens comprises a first curved surface and a second curved surface, the second lens comprises a third curved surface and a fourth curved surface, the third lens comprises a fifth curved surface and a sixth curved surface, the fourth lens comprises a seventh curved surface and an eighth curved surface, the fifth lens comprises a ninth curved surface and a tenth curved surface, the sixth lens comprises an eleventh curved surface and a twelfth curved surface, the seventh lens comprises a thirteenth curved surface and a fourteenth curved surface, the eighth lens comprises a fifteenth curved surface and a sixteenth curved surface, the first to the sixteenth curved surfaces are successively arranged along the transmission direction of the incident light ray, radiuses of curvature of the first to the sixteenth curved surfaces are 42.8, 9.2, 13, −14, −14, 4, 4, 65, 62, 16, 16, −6, −6, −14, −13, and −40, respectively, an unit is millimeter, an upper limit deviation of the radius of curvature is 5%, and a lower limit deviation is 5%.

3. The optical lens according to claim 2, wherein central thicknesses of the first to the eighth lens are 1, 6, 3, 2, 2, 4, 1, and 1, respectively, an unit is millimeter, an upper limit deviation of the central thickness is 5%, and a lower limit deviation is −5%.

4. The optical lens according to claim 2, wherein a distance between the second curved surface and the third curved surface along a principal optical axis is 6 millimeters, a distance between the eighth curved surface and the ninth curved surface along the principal optical axis is 0.3 millimeters, and a distance between the fourteenth curved surface and the fifteenth curved surface along the principal optical axis is 18 millimeters, an upper limit deviation of the distance is 5%, and a lower limit deviation is −5%.

5. The optical lens according to claim 1, wherein the first to the eighth lenses are rotational symmetry about a principal optical axis.

6. The optical lens according to claim 1, wherein the first to the eighth lens have spherical surfaces.

7. The optical lens according to claim 1, wherein the first to the eighth lens have ratios of refractive index to Abbe number of 1.62/60, 1.69/54, 1.7/40, 1.6/32, 1.56/58, 1.69/50, 1.75/27, and 1.62/60, with an upper limit deviation of 5%, and a lower limit deviation of −5%.

8. The optical lens according to claim 1, wherein the first to the eighth lenses are optical glasses.

9. The optical lens according to claim 1, further comprising a ninth lens, wherein the ninth lens and the first lens are successively and coaxially arranged along the transmission direction of the incident light ray.

10. The optical lens according to claim 9, wherein the ninth lens has a ratio of refractive index to Abbe number of 1.5/64, with an upper limit deviation of 5%, and a lower limit deviation of −5%.

11. The optical lens according to claim 9, wherein a projection of the ninth lens along the incident light ray is a circle having a diameter of 42 millimeters, with an upper limit deviation of the diameter of 5%, and a lower limit deviation of −5%.

12. The optical lens according to claim 9, wherein the ninth lens comprises a seventeenth curved surface and an eighteenth surface, curvatures of the seventeenth curved surface and the eighteenth surface are zero.

13. The optical lens according to claim 12, wherein a distance between the eighteenth curved surface and the first curved surface along a principal optical axis is 1 millimeters, with an upper limit deviation of the distance of 5%, and a lower limit deviation of −5%.

14. The optical lens according to claim 12, wherein the ninth lens has a thickness of 3 millimeters, with an upper limit deviation of 5%, and a lower limit deviation of −5%.

15. The optical lens according to claim 12, wherein the ninth lens is a planar protective glass.

16. The optical lens according to claim 12, wherein a distance between the seventeenth surface and an imaging surface is 51.7 millimeters.

* * * * *